United States Patent [19]
Tantlinger

[11] 3,944,201
[45] Mar. 16, 1976

[54] TAB STYLE CANTILEVER SEAT MOUNT

[75] Inventor: Keith W. Tantlinger, Coronado, Calif.

[73] Assignee: Rohr Industries, Inc., Chula Vista, Calif.

[22] Filed: Nov. 8, 1974

[21] Appl. No.: 522,219

[52] U.S. Cl................................ 296/63; 297/282
[51] Int. Cl.² ........................................ B60N 1/00
[58] Field of Search ...... 296/63, 64, 28 A; 105/345, 105/347; 297/232, 243, 244, 245, 250, 450; 9/7; 244/122 R, 118 P

[56] References Cited
UNITED STATES PATENTS

| | | | |
|---|---|---|---|
| 1,762,622 | 6/1930 | Gray | 297/450 |
| 3,131,650 | 5/1964 | Eggert | 296/28 A |
| 3,428,976 | 2/1969 | Robinson | 9/7 |
| 3,619,006 | 11/1971 | Barecki | 297/232 |
| 3,747,979 | 7/1973 | Barecki | 296/63 |
| 3,802,738 | 4/1974 | Tantlinger | 297/232 |

FOREIGN PATENTS OR APPLICATIONS

| | | | |
|---|---|---|---|
| 43-20484 | 9/1968 | Japan | 296/28 A |

Primary Examiner—Robert J. Spar
Assistant Examiner—Ross Weaver
Attorney, Agent, or Firm—Patrick J. Schlesinger

[57] ABSTRACT

In a transit vehicle, such as a bus or rail car, wherein each vehicle side wall comprises a framework of upright posts or mullions spaced apart for mounting the vehicle windows therebetween, and covered exteriorly below the windows with strakes of extruded aluminum, slots are provided at selected heights in the front and rear sides, respectively, of each two mullions between which a seat is to be mounted. One mounting tab extends from the wall end of the seat portion of each seat, and another from the wall end near the upper end of the seat back portion. These mounting tabs are inserted one in each of the openings provided in the facing sides of two mullions between which the seat is to be mounted, and the seat is secured in such position by a retaining screw which anchors the seat to the wall.

10 Claims, 6 Drawing Figures

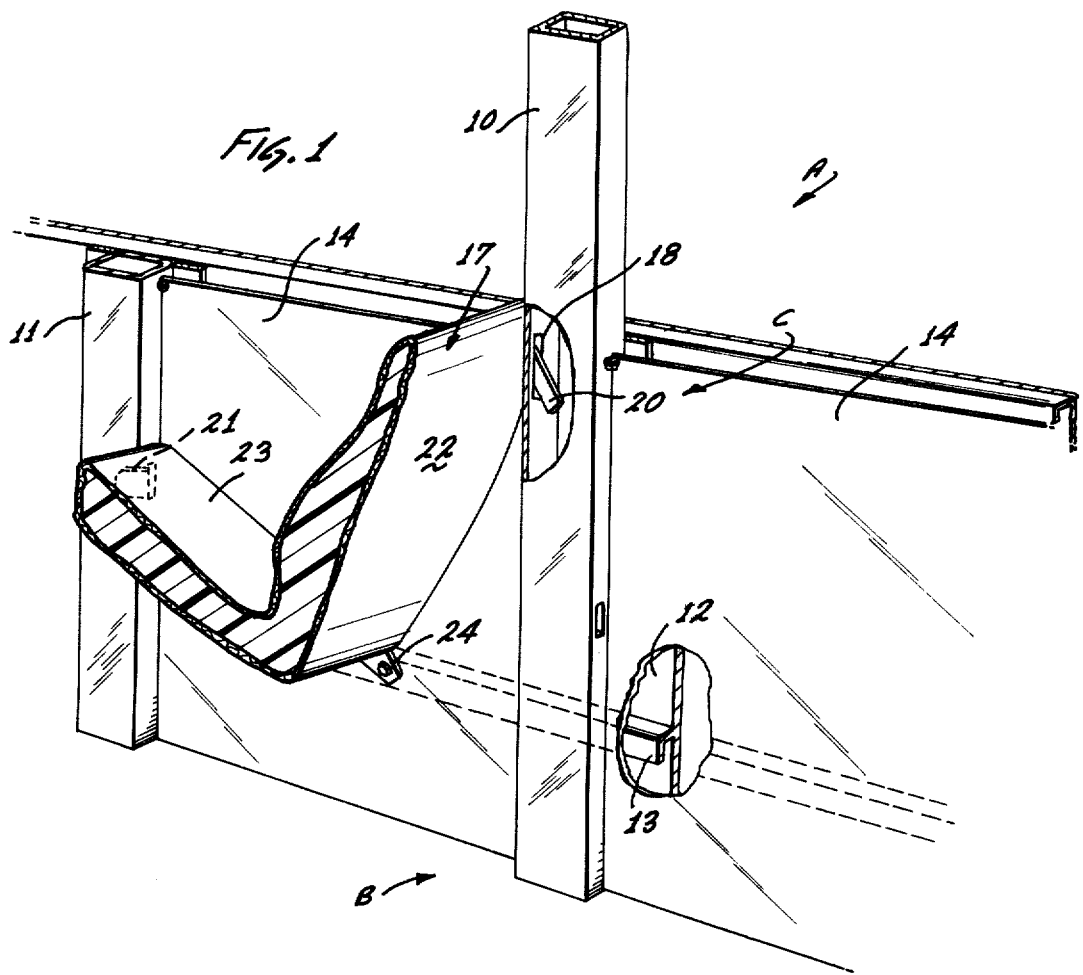
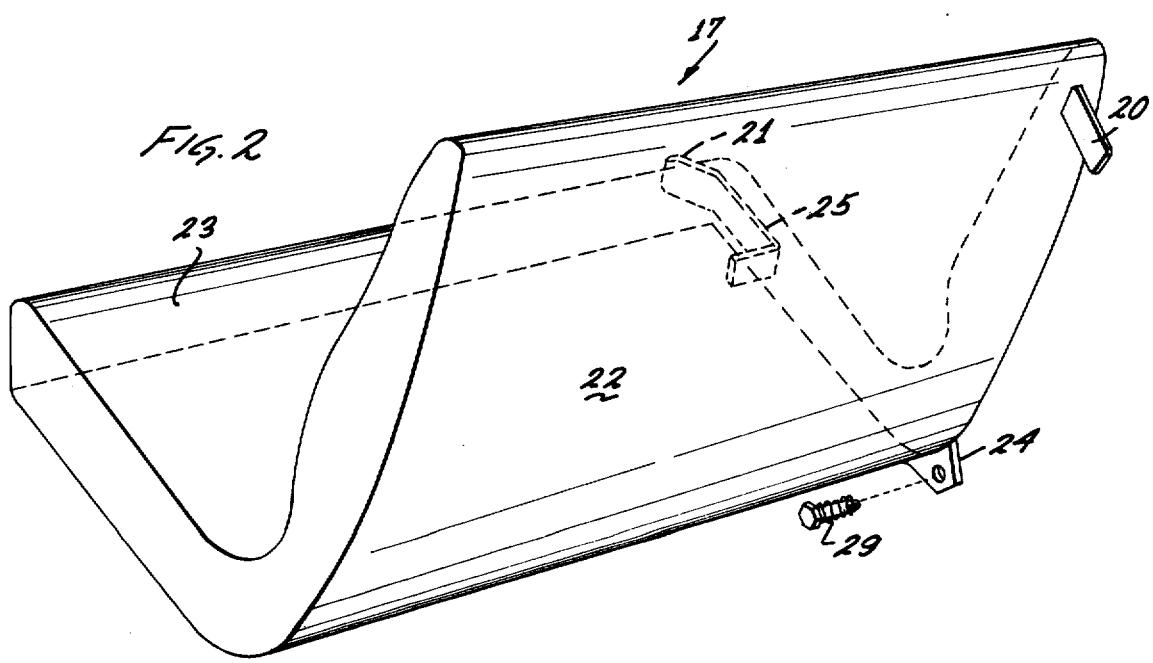

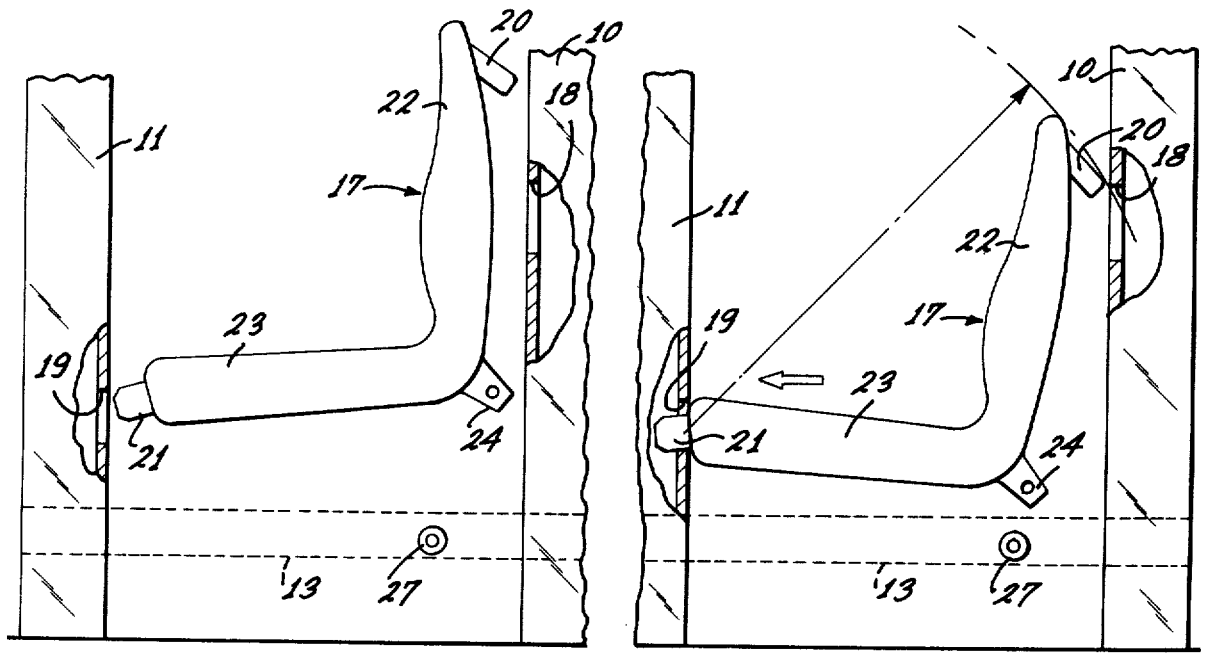
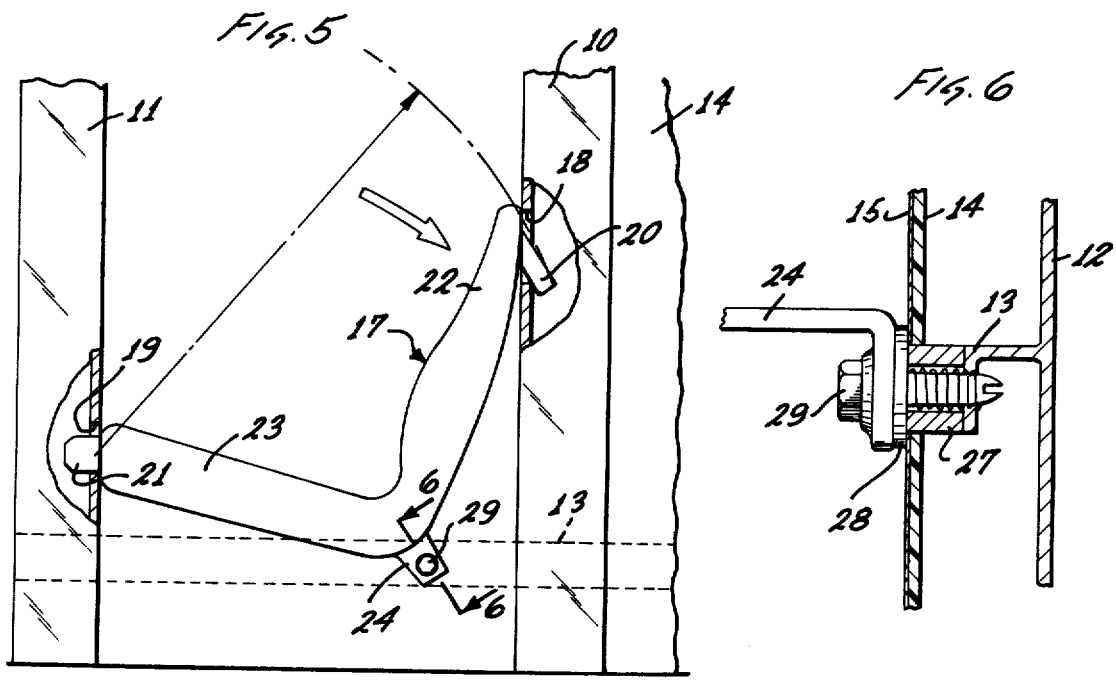

TAB STYLE CANTILEVER SEAT MOUNT

BACKGROUND OF THE INVENTION

In many recently designed transit vehicles, each side wall comprises an inner frame structure including upright posts or mullions spaced apart to receive the windows of the vehicle therebetween, and an outer covering below the window area of extruded aluminum strakes secured to the mullions. It is desirable that the mullions, where possible, extend from floor to roof structure of the vehicle, and since these mullions are a strong, structural part of the wall, it has been common practice to mount on them cantilever seats, which are used almost universally on the newer transit vehicles. In existing cantilever seat mounting means of this type, such arrangement unfortunately positions a passenger's head more or less laterally opposite the post or mullion which supports his seat.

SUMMARY OF THE INVENTION

A seat for a transit vehicle having side walls comprising spaced vertical mullions covered exteriorly over their lower portions with structural strakes comprises a generally horizontal seat portion and generally upright back portion secured together to define a selected seating angle. A first seat mounting element is mounted on a forward portion of the wall end of the seat portion, and a second seat mounting element is mounted on an upper portion of the wall end of the back portion. Mounting element receiving means are provided on the rearwardly and forwardly facing sides, respectively, of each two mullions between which a seat is to be mounted, and these means receive, respectively, the mounting elements on the seat and back portions of a seat to be mounted between the two mullions. Anchor means secures the wall end of the seat to the strake material in position to provide cantilever support for the seat and to retain the mounting elements in their respective receiving means.

BRIEF DESCRIPTION OF THE DRAWINGS

The objectives and advantages of the invention will be apparent from the following description and the accompanying drawings, wherein:

FIG. 1 is a fragmentary, perspective view of the wall end portion of a seat mounted in a transit vehicle in accordance with the invention, portions being broken away.

FIG. 2 is a perspective view of the seat shown in FIG. 1.

FIGS. 3, 4 and 5 show successive stages in the mounting of the seat shown in FIG. 1.

FIG. 6 is an enlarged, fragmentary, sectional view taken along line 6—6 of FIG. 5.

DETAILED DESCRIPTION OF THE PREFERRED FORM OF THE INVENTION

Referring to the drawings in detail, and first to FIG. 1, pertinent portions of an illustrative transit vehicle A comprise a usual floor structure B and side wall C having upright frame posts or mullions 10 and 11. These and the other usual mullions, not shown, preferably are of rectangular steel tubing or extruded aluminum, and are located at selected, spaced intervals along each side wall of the vehicle.

The vehicle windows, not shown, are mounted between adjacent mullions, most of the latter being full mullions extending from floor to roof structure except where some special structural feature of the vehicle requires the use of a shorter or stub mullion 11.

The mullions below the window area are covered exteriorly by extruded aluminum strakes 12 provided with integral angle support flanges 13, such as the flange bearing on the mullions 10 and 11 and secured thereto by usual rivets, not shown. Wall liner panels 14 of suitable material, for example, structural plastic foam preferably with facing material 15 of suitable sheet material bonded to their exposed inner surfaces, are mounted one between each two adjacent mullions below the window area.

Depending upon which way the seats 17 are to face in a vehicle in which they are to be mounted, slotted openings 18 and 19 are provided at selected heights on the forwardly and rearwardly facing sides, respectively, of each mullion to receive therein seat mounting tabs 20 and 21 respectively. The openings preferably are punched, and the mounting tabs extend, respectively, rearwardly from an upper portion of the generally upright back portion 22 of each seat 17, and forwardly from the forward edge of the generally horizontal seat portion 23, of each seat, both mounting tabs being located at the wall end of the seat. In order to facilitate the mounting of the seat on a vehicle side wall, the rearwardly extending mounting tab 18 preferably is disposed substantially tangent to an arc 31, see FIG. 5, swung from a center at the base of the other tab 21.

An anchor tab 24 extends downwardly, preferably from the junction area of the seat portion 23 with the back portion 22, also at the wall end of the seat.

The mounting and anchor tabs are all strongly and rigidly attached to the seat structure, the manner of their attachment depending in part at least upon the structure of the seat itself. For example, the seat 17 illustrated is of molded structural plastic foam bonded to an overall facing 17a of sheet metal, see FIG. 1. In this structure, an extension 25, see FIG. 2, is provided on the inner end of each tab, the extensions being embedded in the foam of the seat during the molding process. With other types of seat structure, the tabs may be secured to the seat structure by means readily apparent to, or within the capability of routine design, by an engineer or designer assigned to such task.

A support bushing 27, best shown in FIG. 6, of suitable material, such as metal or suitable strong plastic is fitted into a hole provided therefor in each liner panel 14 and bears on the angle flange 13 in position to align with a hole provided in the anchor tab 24 of a seat having its mounting tabs 20 and 21 fully inserted in their respective slots. A bearing washer 28 also preferably is interposed between each anchor tab 24 and its associated support bushing 27.

With the seat 17 in its final, mounted position, as shown in FIG. 4, and the washer 28 in place, a drill, not shown, of suitable size is inserted through the aligned holes in the anchor tab 24, washer 28 and bushing 27, and a hole is drilled in the angle flange 13. A self-tapping screw 29, see FIG. 5, is then inserted in these aligned holes and is screwed home, as shown in FIG. 5, thereby securing the seat 17 in cantilever mounted position on the side wall C.

OPERATION OF THE INVENTION

With the vehicle side wall assembled as shown in FIG. 1, and a bushing 27 inserted in the hole provided therefor in each of the lining panels 14; a seat 17, to be installed is placed between two adjacent mullions, such as the mullions 10 and 11, with the wall end of the seat flush against the vehicle side wall as shown in FIG. 3 and with the forwardly extending tab 21 at the entrance to the opening 19. The terms "forward" and "rearward" as used herein are relative to a person seated in the seat and not to the vehicle in which the seat is mounted.

The seat is then moved bodily forward to fully insert the tab 21 in its opening 19 as shown in FIG. 4 and is then rocked clockwise from its position of FIG. 4 to its position of FIG. 5 to fully insert the tab 20 in the opening 18 and also to position the anchor tab 24 with the hole therein in register with the bore of the bushing 27. A washer 10 is then interposed between the anchor tab 24 and the bushing 27 and is centered on the bushing as shown in FIG. 6. A drill of suitable size, not shown, is then inserted in the aligned holes in the anchor tab 24, washer 18, and bushing 27 and is actuated to drill a hole in the angle flange 13. A self-threading screw 29 is then inserted in the aligned holes in the anchor tab, washer and bushing and is screwed home into the hole drilled in the angle flange, thereby completing the mounting of the seat. The seat can be removed by reversing the foregoing procedure.

The invention provides a strong, simple, rattle-free cantilever mounting for a seat for a transit vehicle, with no fastenings exposed to invite tampering or vandalism, and with the heads of the passengers opposite the windows instead of the mullions. While capable of remaining in place normally throughout the life of a vehicle in which it is installed, the seat can be easily and quickly removed and replaced in the event it should become necessary or desirable.

Having thus described the invention, what is claimed as new and useful and desired to be secured by U.S. Letters Patent is:

1. Cantilever seat mounting mechanism for a transit vehicle comprising, in combination with a vehicle side wall having a plurality of vertical mullions spaced apart to receive windows between the upper portions of adjacent mullions with the lower portions of the mullions below the windows covered exteriorly by structural material, and each of the mullions projecting inwardly into the interior of the vehicle,
    a passenger seat comprising a generally upright back portion and a generally horizontal seat portion, said back and seat portion being joined together to define a selected seating angle, one end of the seat being the wall end thereof,
    a first seat mounting member, on, and extending forwardly from, a forward portion of the seat portion of said seat at the wall end thereof,
    a second seat mounting member on, and extending rearwardly from, an upper portion of the back portion of said seat, also at the wall end thereof,
    mounting member engaging means at respectively selected heights on the forwardly and rearwardly facing sides, respectively, of each of the inwardly projecting portions of two adjacent mullions of such side wall between which two mullions the seat is to be mounted, each of said engaging means being constructed and located to receive, and have interlocking, supporting engagement with, one of said mounting members.

2. Cantilever seat mounting mechanism as defined in claim 1 wherein anchor means is provided to retain the mounting members in their respective engaging means, said anchor means comprising an anchor tab extending downwardly from the seat adjacent the juncture of the seat and back portion of the seat, and a fastener secures the anchor tab to such side wall element.

3. Cantilever seat mounting mechanism as defined in claim 2 wherein the structural material below the window area comprises at least one longitudinally extending, extruded aluminum strake, attached exteriorly to the mullions, a liner panel is mounted in the space between each adjacent two mullions interiorly of the at least one strake, the mullions projecting inwardly beyond the liner panels, a bushing is mounted in a hole provided therefor in each liner panel in position to interpose said bushing between the anchor tab of a seat mounted between such two mullions and an element of the at least one strakes, and a fastener is inserted through an opening provided therefor in the anchor tab, through the bushing, and is secured to such strake element.

4. Cantilever seat mounting mechanism as defined in claim 1 wherein the seat is molded of structural, plastic foam bonded to a conforming cover of sheet material, and an inward extension is provided on the inner end of at least one of the seat mounting members, said at least one extension being embedded for support in the structural foam of its respective seat.

5. Cantilever seat mounting mechanism as claimed in claim 1 wherein the first seat mounting member comprises a metal tab extending forwardly from the wall end of the seat portion, the second seat mounting member comprises a metal tab extending rearwardly from the back of the seat mounting member, and each seat mounting member engaging means comprises inwardly projecting mullion structure defining an opening in such facing side of its respective mullion.

6. Cantilever seat mounting mechanism as claimed in claim 5 wherein the seat mounting tab on the seat portion of the seat is positioned to enter its mullion slot, when aligned therewith, upon a forward bodily movement of the seat, and the seat mounting tab on the back portion of the seat is positioned to enter its mullion slot upon a selected rotative movement of the seat about an axis through the first seat mounting tab when the latter is inserted in its mullion slot.

7. Cantilever seat mounting mechanism as claimed in claim 6 wherein the second seat mounting tab is elongated and its longitudinal center line is substantially tangent to an arc the center of which is substantially within the first seat mounting tab.

8. Cantilever seat mounting mechanism for a transit vehicle comprising, in combination with a vehicle side wall structure having a framework including a plurality of vertical mullions spaced apart to receive a window between the upper portions of each two adjacent mullions, said mullions projecting inwardly into the vehicle, and having tab-receiving openings of pre-determined size at selected heights in the facing sides of the inwardly projecting portions of each two thereof between which a seat is to be mounted, the wall below the window area being covered exteriorly by structural material,
    a passenger seat comprising a generally upright back portion and a generally horizontal seat portion, said back and seat portions being joined together to define a selected seating angle, one end of the seat being the wall end thereof,
    a first seat mounting tab extending forwardly from the wall end of the seat portion of the seat, said first mounting tab being of a size, and so located, as to enter a tab-receiving opening provided therefor in one of two mullions between which the seat is to be mounted, a second seat mounting tab extending in a direction oppositely to the first seat mounting tab from the wall end of the seat back portion and in upwardly spaced relation to the seat portion of the seat, said second seat mounting tab being of a size, and so located, as to enter a tab-receiving opening provided therefor in the other of such two mullions, the size of the seat, the location of the seat mounting tabs and their respective mullion openings being such that when the two seat mounting tabs are fully inserted in their respective mullion openings, the seat is supported thereby at a selected height in cantilever manner, and anchor means securing the seat to the side wall, thereby retaining the mounting tabs in their respective openings.

9. Cantilever seat mounting mechanism for a transit vehicle comprising, in combination with a vehicle side wall structure having two inwardly offset, vertical portions between which a seat is to be mounted, the facing sides of the two inwardly offset portions each having a tab-receiving opening at a selected height therein, a substantially unitary passenger seat comprising a generally upright back portion and a generally horizontal seat portion, one end of the seat comprising the wall end thereof, a first mounting tab structurally secured to and extending forwardly from the wall end of the seat portion, a second mounting tab structurally secured to and extending rearwardly from the wall end of the seat back portion near the upper end thereof, each mounting tab and the opening provided therefor being so located that upon inserting a selected one of the tabs in its respective opening in one of the inwardly offset wall portions and rocking the seat from a position clear of the other inwardly offset wall portion toward said other inwardly offset wall portion, the second mounting tab enters its respective opening in the other inwardly offset wall portion, a portion of the wall end of the seat between the two tabs being in bearing relation with a wall element between the offset wall portions to provide, with the first and second mounting tabs, cantilever support for the seat.

10. Cantilever seat mounting mechanism as claimed in claim 9 wherein means anchors to a structural wall element a portion of the wall end of the seat which is offset downwardly from a line interconnecting the first and second mounting tabs.

* * * * *